Inventor
Jean Grosvalet
By Cushman, Darby & Cushman
Attorneys

Inventor
Jean Grosvalet
By Cushman, Darby & Cushman
Attorneys

United States Patent Office 3,436,612

Patented Apr. 1, 1969

3,436,612
SEMI-CONDUCTOR DEVICE HAVING DIELECTRIC AND METAL PROTECTORS

Jean Grosvalet, Paris, France, assignor to CSF—Compagnie Generale de Telegraphie sans Fil, a corporation of France Filed Dec. 2, 1965, Ser. No. 511,040
Claims priority, application France, Dec. 3, 1964, 997,223
Int. Cl. H01l 5/00, 3/00
U.S. Cl. 317—234 2 Claims

ABSTRACT OF THE DISCLOSURE

A semi-conductor device includes a p-n junction. A dielectric layer protects said junction against the ambient atmosphere. A conducting layer covers the dielectric layer and the outer walls of the device which are not protected by the dielectric layer.

The present invention, relates to the passivation of semi-conductor elements, that is to say to the protection of arrangements containing such elements against all environmental effects.

It is well known that in the course of time the characteristics of semi-conductor elements undergo changes.

These changes have been attributed to the instability of the surface properties of semi-conductors in contact with the ambient atmosphere.

A method for insulating semi-conductors against the environmental atmosphere has been proposed by Atalla, Tannebaum and Scheibrier in "The Bell System Technical Journal" of May 1959, page 749. It consists in protecting the junctions between two different silicon regions by a layer of $SiO_2$. This solution led to the development of so-called "planar" diodes and transistors.

Although having definite merits, this method is not perfect for various reasons: the electric field in the active regions of the semiconductor propagates through the oxide to the surface. This has the important consequence of contributing to the induction of movements of the charge (a) inside the oxide itself, and (b) on the surface of the insulator which is in contact with the ambient atmosphere.

The movements of the charge which take place with time constants ranging from a few minutes to several hundred hours produce changes in the potential at the interface between the semi-conductor and the insulator, which produces a change in the surface properties of the semi-conductor and thus also in the characteristics of the element.

Even by increasing the thickness of the oxide or by using other dielectrics which are better adapted to certain applications, such as glasses, resins, etc., it was impossible to solve this difficult problem completely.

It is an object of the invention to solve this problem.

According to the invention there is provided a semi-conductor device including a junction, a dielectric layer protecting said junction against the ambient atmosphere and a conducting layer covering said dielectric layer and the outer walls of said device which are not protected by said dielectric layer.

For a better understanding of the invention reference will be made to the drawing accompanying the following description and in which.

For clarity, certain dimensions of the devices shown have been greatly exaggerated with respest to others.

Figure 1:
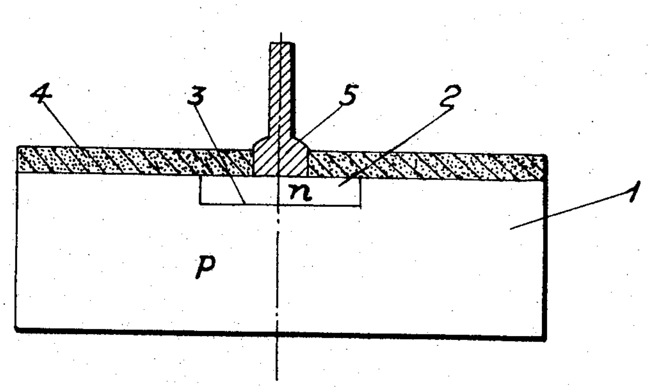
FIG. 1 shows a known diode covered by an oxide layer.

FIG. 1 shows a diode whose passivation, that is protection against the environment, has been obtained according to the so-called "planar" method, described above. This diode is formed by a p-type silicon plate 1 on which has been formed an n-type zone, thus providing a p-n junction 3. A layer of $SiO_2$ 4, through which passes only a metal connection 5, assures the protection of the element.

Figure 2:
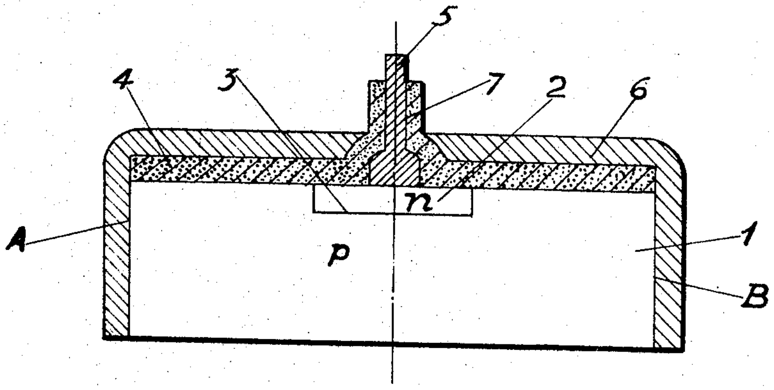
FIG. 2 shows the same diode equipped with a metal film according to the invention.

FIG. 2 shows diagrammatically a diode of the same type covered by a protective film in accordance with the invention. The same reference numerals have been used to designate the same parts in FIG. 2 is in FIG. 1.

As in FIG. 1 the relative dimension of the different parts have not been taken into consideration.

The diode is covered by the insulating layer 4 which ensures its passivation and through which extends only the connection 5.

According to the invention a metal conductor film 6 covers completely the insulating layer 4 and extends along the walls A and B. The insulation of the metal electrode 5 against the film 6 is achieved by surrounding this terminal with an insulator 7. As a consequence the film 6 assumes the potential of the least doped zone, in this case the p-zone.

The intended purpose of the metal film 6 according to the invention will be more easily understood by comparing, respectively, the behaviour of a diode passivated according to known art, i.e. as shown in FIGURE 1, and that of a diode protected according to the invention, i.e. as shown in FIG. 2, in the same environment and under the same unfavourable conditions.

It will be assumed that both diodes are reversely biased and are placed in an atmosphere capable of holding charges in the form of gas ions. In the case of the diode of FIG. 1 and under the action of the postive potential applied to the metal connection 5, the charges begin to move. The positive charges will tend to accumulate on the surface of the oxide layer 4 at variable distances from the electrode 5, depending upon the period of application of the voltage.

These positive charges induce negative charges on the surface of the p-silicon 1. This causes a continuous modification of the surface properties, leading to a change in the characteristics, especially insofar as the reverse current and the avalanche voltage are concerned.

In the case of FIG. 2 according to the invention, the diode comprises a metal coating 6. This coating prevents the accumulation of charges on the surface of the insulator and assures the uniformity of the potential over the whole of the surface of the insulator.

Moreover, since the conducting film is by construction, at the same potential as the p-region 1, i.e. the least doped region of the diode, it follows that the transverse field in the insulator disappears, which prevents movements of the charge in volume, and thus avoids variations of charges on the surface of the p-zone.

The only movements of charges which can still take place are in the insulator 7 surrounding the electrode 5, but this will not affect the surface properties of the semi-conductor.

This structure is capable of operating in a perfectly reliable manner without regard to the environment which may affect the conducting metal layer.

This presents a clear progress compared with the known art because the passivated element becomes insensitive to radiations capable of ionizing the gases forming the atmosphere and its moisture content, which generally cause important changes in the characteristics of semi-conductors.

The conducting layer 6 may be connected to the p-type region 1 and thus cover the walls A and B or be otherwise connected to this region. Layer 6 may also be connected, if need be, to another source of potential.

All this applies equally well to the protection of transistors and integrated circuits.

Figure 3:
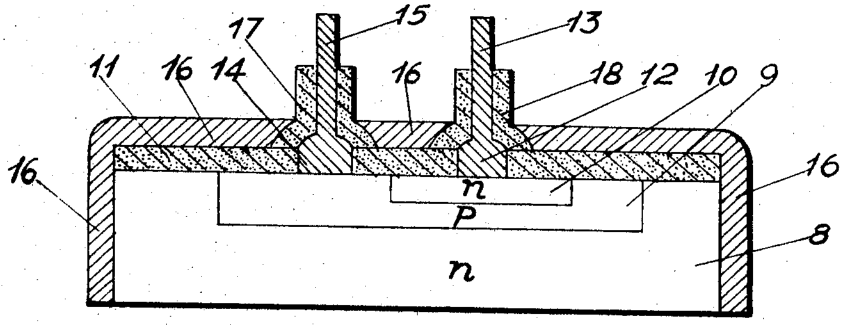
FIG. 3 shows by way of example a transistor protected according to the invention.

FIG. 3 shows by way of example a transistor protected according to the invention against the environment. It comprises an n-type collector 8, a p-type base 9 and an n-type emitter 10. In the case of a silicon transistor, the surface is passivated by a layer of oxide 11, through which extend only the connections, namely the emitter connection 12, terminated in a conductor 13, and the base connection 14, terminated in a conductor 15. The transistor is covered in accordance with the invention by a film of a metal conductor 16, which is insulated from the base and emitter terminals by insulators 17 and 18 respectively.

Figure 4:
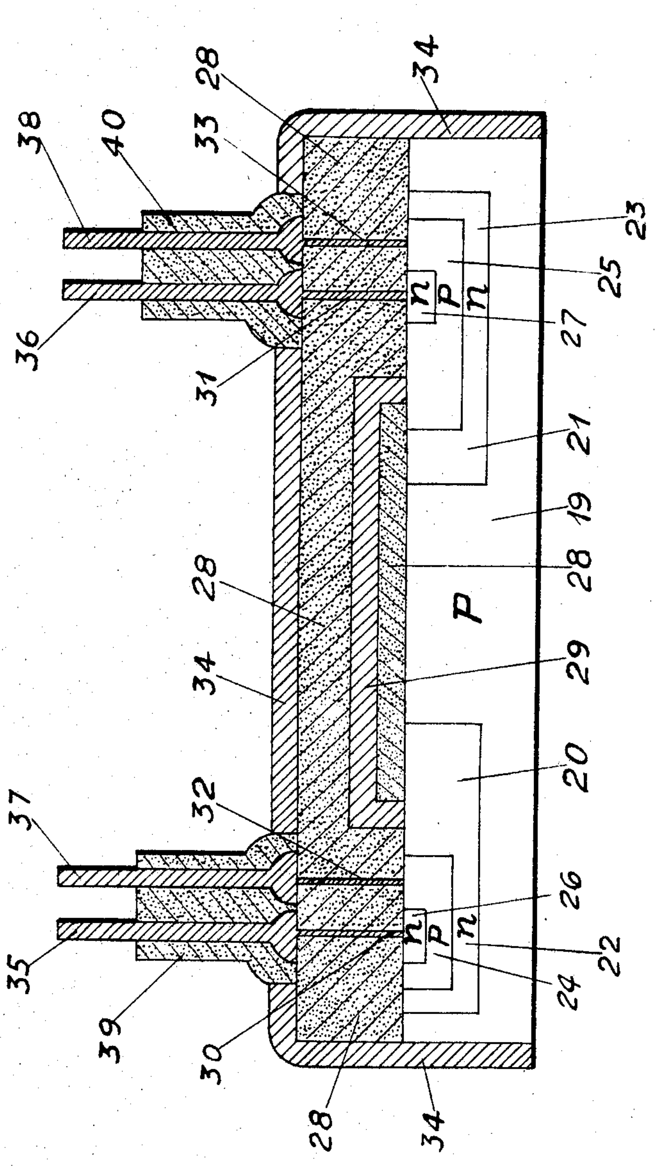
FIG. 4 shows by way of example an integrated circuit protected according to the invention.

FIG. 4 shows, also by way of example only, how the invention may be applied to integrated circuits. On a substrate 19 of p-type silicon are mounted two transistors 20 and 21, comprising, respectively, collectors 22 and 23, bases 24 and 25, and emitters 26 and 27. The element formed in this way is passivated by means of an insulator 28 which covers entirely a connection 29 between the base 25 and the collector 22, which connection is made e.g., according to the "thin" layer technics, the emitter connections 30 and 31, the base connections 32 and 33.

According to the invention a film of a metal conductor 34 is deposited on the surface of the insulator 28.

The insulation of the terminal wires 35 and 36 of the emitters and of the wires 37 and 38 of the bases is effected by insulators 39 and 40.

In all described examples, the choice of the insulator and of the conductor metal forming the film according to the invention and the method of applying it do not present any problem for those skilled in the art.

Of course the invention is not limited to the embodiments hereinbefore described which were given solely by way of example. In particular the invention is applicable to any kind of semi-conductor.

What is claimed is:

1. A semiconductor device comprising a semiconductor body of a first type of conductivity having a first and a second face, a zone of the opposite type of conductivity deposited in said first face, a dielectric layer deposited over said first face and at least partially over said zone, a conductive layer deposited over said dielectric layer, at least one terminal connection to said zone, said connection crossing said dielectric layer, and being electrically insulated from said conductive layer, said conductive layer extending over the outer walls of said device, which are not protected by said dielectric layer.

2. A semiconductor device as claimed in claim 1, wherein said junction is between p- and n-doped silicon, said dielectric layer being silica.

References Cited

UNITED STATES PATENTS

| | | | |
|---|---|---|---|
| 2,497,770 | 2/1950 | Hanson | 317—234 |
| 2,725,505 | 11/1955 | Webster et al. | 317—234 |
| 3,165,430 | 1/1965 | Hugle | 317—234 X |
| 2,703,855 | 3/1955 | Koch et al. | 317—234 |
| 2,781,480 | 2/1957 | Mueller | 317—234 |
| 2,962,396 | 11/1960 | Pankove | 317—234 |
| 2,980,832 | 4/1961 | Stein et al. | 317—234 |
| 3,097,308 | 7/1963 | Wallmark | 317—234 |
| 3,271,201 | 9/1966 | Pomerantz | 317—234 |

JOHN W. HUCKERT, *Primary Examiner.*

A. J. JAMES, *Assistant Examiner.*

U.S. Cl. X.R.

317—235